United States Patent
Adams et al.

(10) Patent No.: US 6,314,343 B1
(45) Date of Patent: Nov. 6, 2001

(54) AIRCRAFT FLIGHT MODE SELECTOR SYSTEM

(75) Inventors: Don L. Adams, Fairfield; Thomas J. Provenzano, Stratford; Ari M. Novis, Rocky Hill, all of CT (US); Ann Crowley, Zelienople, PA (US)

(73) Assignee: Sikorsky Aircraft Corp., Stratford, CT (US)

( * ) Notice: Subject to any disclaimer, the term of this patent is extended or adjusted under 35 U.S.C. 154(b) by 0 days.

(21) Appl. No.: 09/471,862

(22) Filed: Dec. 23, 1999

(51) Int. Cl.⁷ .................................................. B64C 19/02
(52) U.S. Cl. ................... 701/3; 701/14; 701/4; 244/1 R; 244/75 R
(58) Field of Search ................... 701/14, 36, 1, 701/4; 244/1 R, 75 R (56) References Cited

U.S. PATENT DOCUMENTS

| | | | |
|---|---|---|---|
| 5,019,980 | * 5/1991 | Starr et al. | 364/424.04 |
| 5,416,705 | * 5/1995 | Barnett | 364/424.06 |
| 5,844,503 | * 12/1998 | Riley et al. | 340/845 |
| 6,122,141 | * 8/2000 | Briffe et al. | 701/14 |
| 6,131,065 | * 10/2000 | Marszalek | 701/120 |

OTHER PUBLICATIONS

Business & Commercial Aviation—Sep. 1998, P57; vol. 83, #3.*

* cited by examiner

Primary Examiner—William A. Cuchlinski, Jr.
Assistant Examiner—Olga Hernandez
(74) Attorney, Agent, or Firm—William W. Jones (57) ABSTRACT

An aircraft flight mode selector assembly utilizes computer-generated menus and soft wired bezel keys to enable the use of a greater number of flight modes to be accessed in a smaller space than is presently possible with a flight mode selector consisting solely of conventional dedicated switches, switch indicator lights, and hard wired selector panel assemblies. Serial bus connections between the flight mode selector assembly and the flight control computer in the aircraft reduce the amount of wiring needed for the flight mode selector assembly, as compared to present protocol which utilizes dedicated wiring for each dedicated switch in the aircraft flight mode selector. The use of computer-generated displays and menus permits easy expansion of the flight mode selector assembly without the need to add additional switches and switch indicator lights. The inclusion of a display information look-up table in the processor controller, which table is separate from the software program in the controller, allows changes to the flight mode selector panel display to be made merely by changing the look-up table. The flight mode selector assembly also includes a pilot message display which is used to convey text messages to the pilot of the aircraft.

9 Claims, 7 Drawing Sheets

| Menu | 4 | | | | | | DISPLAY CHARACTERISTIC |
|---|---|---|---|---|---|---|---|
| # | Name | Bit | 1 | 2 | 3 | 4 | 5 |
| 1 | Field 17 | – | A | P | P | | 1 |
| 2 | Field 18 | – | I | L | S | | 1 |
| 3 | Field 1 | – | A | L | T | P | 1 |
| 4 | Field 2 | – | | R | A | | 1 |
| 5 | Field 3 | – | | V | S | | 1 |
| 6 | Field 4 | – | | G | A | | 1 |
| 7 | Field 5 | – | L | O | C | | 1 |
| 8 | Field 6 | – | | G | S | | 1 |
| 9 | Field 7 | – | D | C | L | | 1 |
| 10 | Field 8 | – | R | T | N | | 1 |
| 11 | Field 9 (0) | 00 | | | | | 1 |
| 12 | Field 9 (1) | 01 | A | R | M | | 1 |
| 13 | Field 9 (2) | 10 | | C | A | P | 5 |
| 14 | Field 9 (3) | 11 | | | | | 1 |
| 15 | Field 10 (0) | 0 | | | | | 1 |
| 16 | Field 10 (1) | 1 | | O | N | | 5 |
| 17 | Field 11 (0) | 0 | | | | | 1 |
| 18 | Field 11 (1) | 1 | | O | N | | 5 |
| 19 | Field 12 (0) | 00 | | | | | 1 |
| 20 | Field 12 (1) | 01 | | O | N | | 5 |
| 21 | Field 12 (2) | 10 | | | | | 1 |
| 22 | Field 12 (3) | 11 | | | | | 1 |
| 23 | Field 13 (0) | 00 | | | | | 1 |
| 24 | Field 13 (1) | 01 | A | R | M | | 1 |
| 25 | Field 13 (2) | 10 | | C | A | P | 5 |
| 26 | Field 13 (3) | 11 | | | | | 1 |
| 27 | Field 14 (0) | 00 | | | | | 1 |
| 28 | Field 14 (1) | 01 | A | R | M | | 1 |
| 29 | Field 14 (2) | 10 | | C | A | P | 5 |
| 30 | Field 14 (3) | 11 | | | | | 1 |
| 31 | Field 15 (0) | 00 | | | | | 1 |
| 32 | Field 15 (1) | 01 | A | R | M | | 1 |
| 33 | Field 15 (2) | 10 | | C | A | P | 5 |
| 34 | Field 15 (3) | 11 | | | | | 1 |
| 35 | Field 16 (0) | 00 | | | | | 1 |
| 36 | Field 16 (1) | 01 | | | | | 1 |
| 37 | Field 16 (2) | 10 | | | | | 1 |
| 38 | Field 16 (3) | 11 | | | | | 1 |

SAMPLE PORTION OF LOOKUP TABLE

AIRCRAFT FLIGHT MODE SELECTOR SYSTEM

TECHNICAL FIELD

This invention relates to an improved aircraft flight mode selector system for use in connection with aircraft such as airplanes or helicopters, for example. The assembly of this invention includes computer-generated display menus and soft flight mode selector keys which enable the use of a greater number of aircraft flight modes to be accessed from a smaller envelope than is presently possible with existing flight mode selector assemblies.

BACKGROUND ART

Modern aircraft, such as helicopters and the like, include flight mode selector assemblies which enable the flight crew to select various flight characteristics for the aircraft. Flight modes will vary, depending on the type of aircraft, but will generally include altitude preselect switches whereby the pilot can preselect an altitude at which the aircraft will fly; approach preselect switches whereby the pilot can select various ground approach options; altitude hold switches wherein the pilot can maintain an altitude by means of external barometric air pressure readings; and other options too numerous to mention.

Conventional aircraft flight mode selectors include dedicated "on-off" switches and switch indicator lights, with the switch panel being hard wired to the flight control computer. Each switch on the flight mode selector panel controls one facet of the flight mode, thus the more sophisticated the flight mode selector system is, and the more flight mode facets there are, the more complex, bulky and weighty the flight mode selector system becomes. With conventional flight mode selector systems, when additional flight mode options are to added to the system, then additional hard wired switches and on-off indicator lights must be added to the cockpit console. It will be readily appreciated that the addition of further flight control hard wired switches and indicator lights to a cockpit console, as required by conventional systems, is undesirable due to weight, space and complexity constraints.

It would be highly desirable to provide an aircraft flight mode selector and control system which is more compact than present systems; allows the inclusion of a greater number of flight mode options than present systems; and can be augmented with additional selections with minimal effort.

DISCLOSURE OF THE INVENTION

This invention relates to an improved aircraft flight mode selection and control system which occupies minimal space in the aircraft cockpit, and which provides for an enhanced number of flight mode options for selection by the aircraft's crew. The system of this invention includes a menu display screen which is operable to display a plurality of different flight mode selections. Associated with the display screen are a plurality of bezel soft switches. The soft switches are operable to selectively change the various flight mode selections on the display screen. The display screen also has a plurality of fixed menu switches which are operable to select a particular generic flight mode menu to be displayed on the display screen, and from which particular specific flight modes can be selected by use of the soft switches in the system. Finally, there are a plurality of hard wired annunciator switches and lights associated with the display screen. The annunciator switches are operable to control a subset of flight mode functions that are available at all times and are commonly used. By making them dedicated switches, they are always in the same place and therefore easily found by the pilot. The fact that they are hard wired switches allows them to be easily and quickly accessible without the need to page through menus, and they do not take up space on the menus that could be advantageously used for other functions. The annunciator lights indicate the state ("ON" or "OFF") of the functions controlled by the hard wired switches.

The flight mode selector assembly is connected to a flight control computer by means of two serial data buses, one for transmitting data from the flight mode selector assembly to the flight control computer, and the other for transmitting data from the flight control computer to the flight mode selector. The flight mode selector assembly is connected to two other aircraft systems, the Automatic Flight Control System (AFCS) control panel, and the Airborne System Computer (ASC). The flight mode selector assembly acts as an intermediary between the AFCS control panel and the ASC, and the flight control computer, passing signals between the flight control computer and the AFCS control panel and the ASC. The serial data buses send information from one component of the assembly to another in the form of data "words". Different data words are given names or labels so that the receiving device knows what it is receiving. For example, if a sensor measures speed and altitude, it would transmit a word made up of the speed and a numeric label corresponding to "speed". It would also transmit a different word made up of the altitude and a different numeric label corresponding to "altitude". If the sensor were to use the three digit label "130" for "speed" and "149" for "altitude", the receiver would not confuse the two, and the data buses can send a multitude of different flight mode information between which the receiver can readily differentiate.

The flight mode selector assembly consists of a display screen, its associated switches, a processor, a power supply, and circuitry to support the serial buses. The processor includes a look up table which describes the various display indicia which are to be displayed on the display screen in response to commands from the flight control computer. The pilot requests a particular flight mode by pressing a switch on the flight mode selector. Information as to which switch is actuated is transmitted by the processor in the flight mode selector assembly to the flight control computer. If logic in the flight control computer decides that the selected flight mode is viable and can be enabled by the flight control computer, the flight control computer transmits a code over the serial bus to the flight mode selector. The processor in the flight mode selector uses this code in conjunction with the included look up table to alter the display on the display panel. Thus, by actuating one of the hard wired switches or soft switches, the pilot will be able to select different flight modes and see a confirmation of the flight mode selected on the display panel.

The system also has the ability to display a plurality of different predetermined printed meassages directed to the pilot from the flight control computer, which messages instruct the pilot to perform certain functions. Illumination intensity of the display screen indicia can be selective varied by the pilot, and the system has the ability to continuously monitor its functionality. When system functioning problems are diagnosed, a backup system can be activated by the pilot.

It is therefore an object of this invention to provide an improved aircraft flight mode selector system which is compact in size, and enables selection of a greater number of flight mode options than are currently available.

It is an additional object of this invention to provide a system of the character described which can be altered and updated without needing to expand the physical envelope of the system.

It is a further object of this invention to provide a system of the character described which includes a menu display screen that allows the pilot of the aircraft to select one of several specific flight modes from a generic flight mode descriptor.

It is another object of this invention to provide a system of the character described which includes a flight mode look up table which is consulted by the operating system in order to identify menu display indicia which correspond to switches in the system which have been actuated by the pilot.

BRIEF DESCRIPTION OF THE DRAWINGS

These and other objects and advantages of the invention will become more readily apparent from the following detailed description of an embodiment of the invention when taken in conjunction with the accompanying drawings in which.

SPECIFIC MODE FOR CARRYING OUT THE INVENTION

Figure 1:
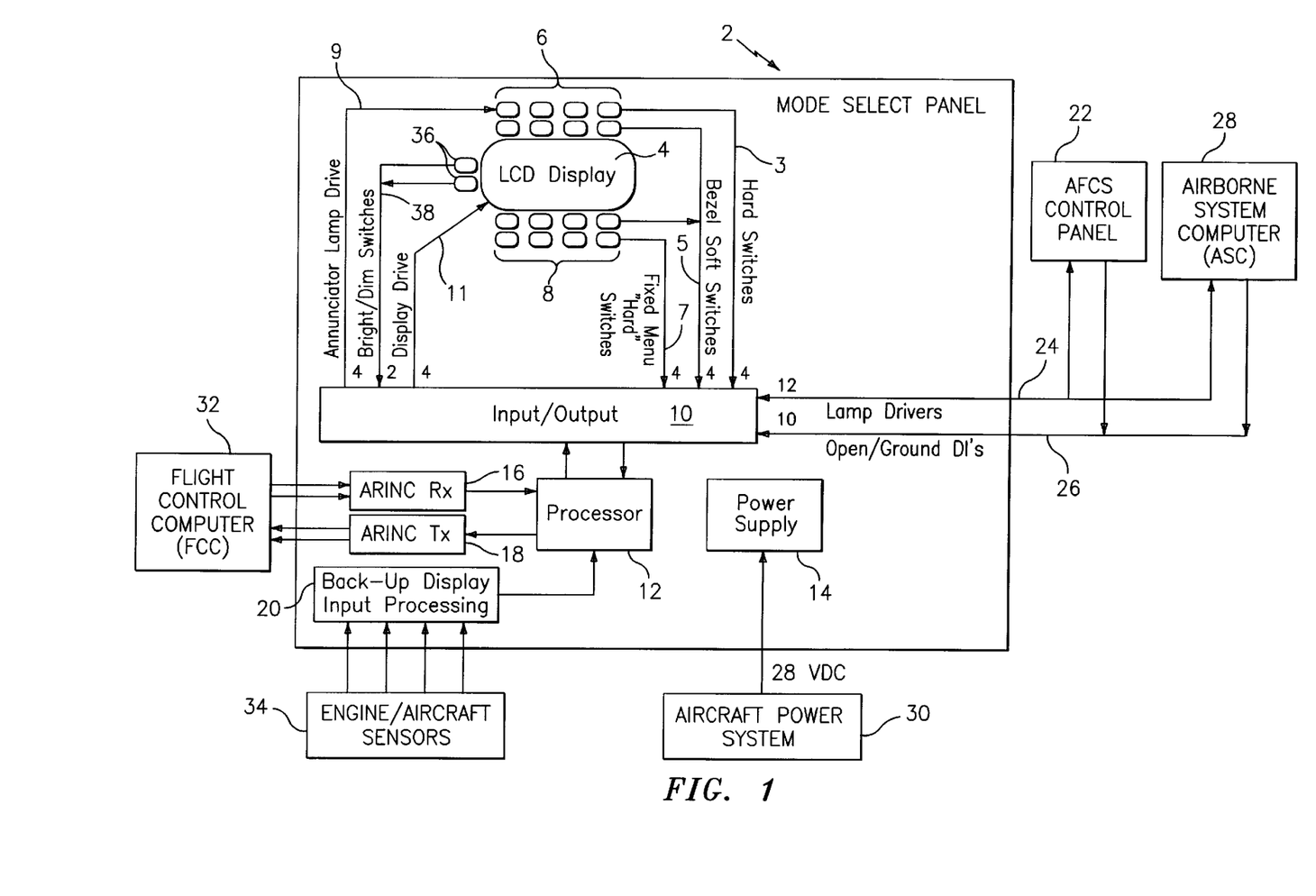
FIG. 1 is a schematic view of an aircraft flight mode control assembly which incorporates the improved flight control system of this invention and how the latter is connected to other systems in an aircraft.

Referring to the drawings, FIG. 1 is a schematic illustration of a flight mode selector assembly formed in accordance with this invention which is designated generally by the numeral 2. The flight mode selector assembly 2 includes a display screen 4; banks of switches 6 and 8; an input/output controller 10; a processor 12; a power supply 14; an input serial bus 16 and an serial output bus 18; and a backup display processor 20 which controls a back-up flight mode menu that the aircraft pilot can use in case any of the main flight control instruments fail. The switch bank 6 communicates with the input/output controller 10 via lines 3 and 5; and the switch bank 8 communicates with the input/output controller 10 via lines 5 and 7. The input/output controller 10 communicates with annunciator lamps in the switch bank 6 via line 9; and the input/output controller 10 communicates with the display screen 4 via line 11.

Display panel switches 36 communicate with the input/output controller 10 via line 38. The switches 36 control the brightness of the indicia displayed on the display screen 4.

The light mode selector assembly 2 is connected with other operating systems on the aircraft as follows. The input/output controller 10 is connected to the automatic flight control system control panel 22 via output lines 24 and 26 respectfully; and the controller 10 is also connected to an airborne system computer 28 via the output lines 24 and 26. The ASC 28 controls all of the main flight instruments. The flight mode selector 2 acts as an intermediary between the AFCS control panel 22 and ASC 28 on one side, and the flight control computer 32 on the other side. The AFCS control panel 22 has switch closures and lamps, and the ASC 28 has switch closures required by the flight-control computer 32. Instead of wiring those switches and lamps directly to the flight control computer 32, they are wired instead from the AFCS control panel 22 and the ASC 28 to the flight mode selector panel 2. The flight mode selector 2 assembles the states of the switches into a data word, and sends the data word to the flight control computer 32 over the serial bus 18. The flight control computer 32 can turn on lamps on the AFCS control panel 22 by sending a command over serial bus 16 to the flight mode selector 2, which then turns on the lamp on the AFCS control panel 22 which it is wired to via line 24. This approach permits the flight control computer 32, to be located far away from the control panel 22 and the ASC 28. By sending the aforesaid signals to the flight mode selector panel 2, there are fewer wires to the remotely located flight control computer 32 and, therefore, less weight. An aircraft power system 30 supplies twenty eight volt DC power to the flight mode selector assembly power supply 14. The serial buses 16 and 18 are connected to a flight control computer 32. The back-up display processor 20 is connected to various engine and other aircraft sensors 34.

Figure 2:
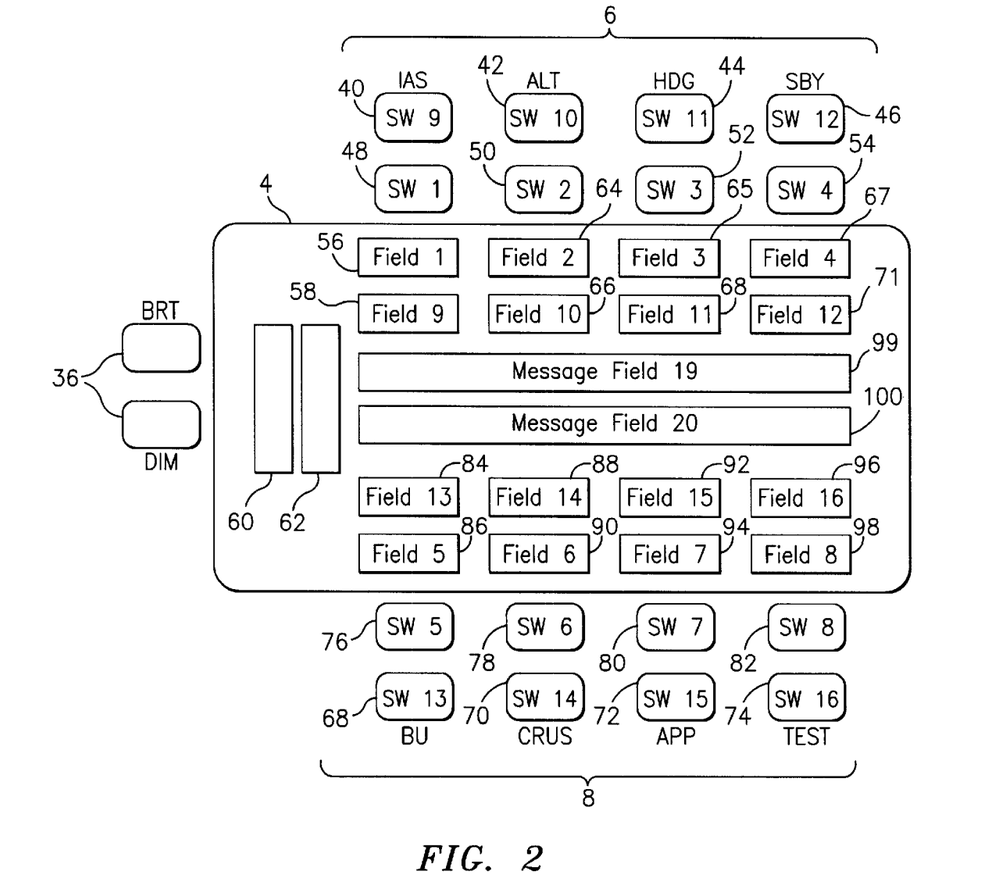
FIG. 2 is a plan view of the flight mode selection panel portion of the assembly of FIG. 1.

Referring now to FIG. 2, details of the display screen 4 and switch banks 6 and 8 are shown. The switch bank 6 includes four switches 40, 42, 44 and 46 which may be hard wired annunciator switches with status lights, which switches control frequently used flight modes such as, for example: "indicated airspeed hold"; "altitude hold"; "heading hold"; and a "standby" switch, which turns off all flight modes when closed. The aforesaid listing of switch functions for the annunciator switches is merely suggestive of such functions, and other flight mode functions could be controlled by these switches. The switch bank 6 also includes a plurality of bezel soft switches 48, 50, 52 and 54 which control a plurality of flight mode display fields 56, 64, 65, and 67 in the display screen 4, and also flight mode menu fields in the display screen 4. For example, the switch 48 can control the display fields 56 and 58, and the menu fields 60 and 62. The switch 50 can control the display fields 64 and 66, as well as the menu fields 60 and 62. Thus the bezel soft switches in the bank 6 can control the display fields which are arrayed opposite the respective soft switches, and also control the menu fields 60 and 62. Details of the flight mode information which may be displayed in the display fields and the menu fields as a result of closing the respective soft switches in the bank 6 is provided hereinafter.

The switches in the bank 8 include hard wired fixed menu switches 68, 70, 72 and 74 which may be used to control flight modes such as: a "back-up" menu which displays engine instruments status, in case any of the main flight instruments fail; a "cruise" menu, which is a standard menu for level aircraft flight; an "approach" menu which is a standard menu for various types of aircraft approaches to the ground, and to airports; and a "test" menu, which allows pilots and maintenance personnel to run system checks. The switches in the bank 8 also include soft bezel switches 76, 78, 80 and 82 which control information displayed in fields 84–98, and which also control the menu fields 60 and 62. Closure of selected ones of the hard wired switches 68–74 enables the soft wired switches 76–82 to further refine the commands of the closed hard wired switches, as will be described in greater detail hereinafter. FIG. 2 also shows a plurality of pilot message fields 99 and 100 in which a variety of instructions to the aircraft pilot can be displayed when necessary for aircraft operation. Examples of such messages include: MS PANEL FAIL; MS PANEL INOP; FD TO STANDBY; END TEST; CANCEL SAR; MBIT PASS; MBIT FAIL; SELECT AP ON; SELECT SAS ON; PITCH TRIM FR DRIVE; and the like. The message fields 99 and 100 have been configured with nineteen characters for spelling out various messages. Larger or smaller fields could also be constructed.

Figure 3:
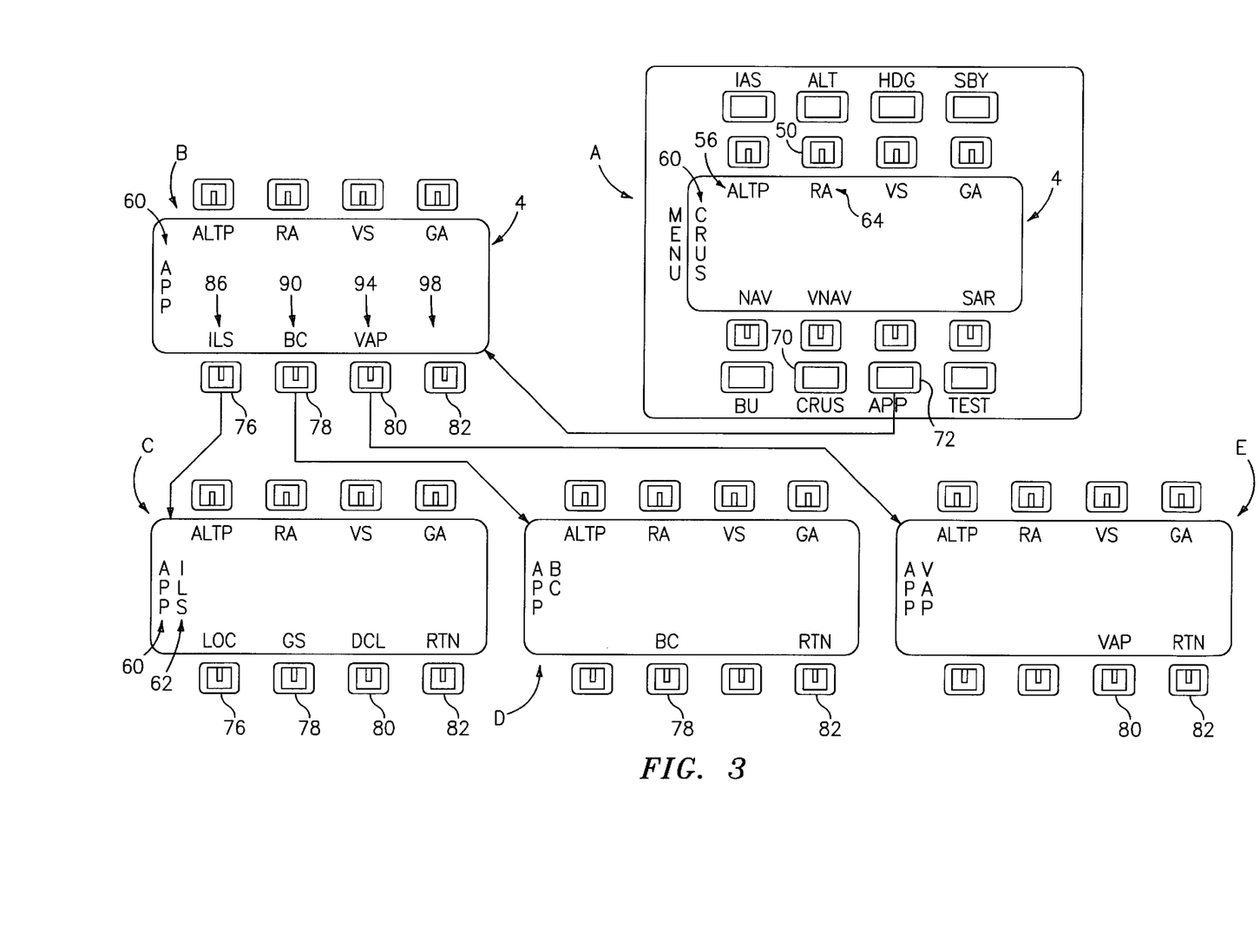
FIG. 3 is a schematic illustration of a typical hard wired switch and soft wired switch functionality diagram, showing the changes in the display screen options when successive hard wired switches and subsequent soft bezel switches are closed.

Referring now to FIG. 3, there is shown a sequence of display screen menus which can occur when a particular combination of the hard wired switches and the soft bezel switches are actuated. Part A of FIG. 3 shows a screen display 4 which appears when the CRUISE switch 70 is actuated. It will be noted that field 60 will display the letters CRUS indicating that the switch 70 has been closed. The various fields which are associated with the soft bezel switches 48–54 and 76–82 which control cruise flight mode choices will display the various functions that the bezel switches control, as seen in part A of FIG. 3. Assume that the APPROACH switch 72 is closed so as to change the display screen menu to that shown in part B of FIG. 3. It is noted that the contents of fields 60, 86, 90, 94 and 98 will change to indicate that the APPROACH flight mode has been selected, and to display various aircraft approach options which the pilot can select by actuating the soft bezel switches 76–80. Parts C, D and E of FIG. 3 show the results of closing the soft bezel switches 76, 78 and 80.

Part C of FIG. 3 shows the screen changes which occur when the instrument landing system (ILS) switch 76 is closed. Fields 60 and 62 indicate that the approach flight mode has been selected and that the instrument landing system sub-menu has also been enabled. When this landing approach combination has been selected by the pilot, the soft bezel switches 76–82 become enabled to select further approach options, namely: a localizer mode (LOC) which is a mode which flies the aircraft to the ILS beacon in a horizontal left to right plane; a glide slope mode (GS), which is a mode for flying the aircraft vertically down the ILS beacon; a decelerate mode (DCL), which is a mode for slowing the aircraft down to a preset airspeed; and a return mode (RTN) which returns the selector to a higher level menu.

Part D of FIG. 3 shows the screen changes which occur when the back course (BC) switch 78 in part B is closed. The BC flight mode is a mode which is used to fly down the ILS beacon from the "back" side. When the BC flight mode has been selected, the sub-menu depicted in part D of FIG. 3 will become available. On the part D sub-menu, the soft bezel switch 82 functions as a return to higher level menu switch, and the soft bezel switch 78 functions as an execute BC flight mode switch.

Figure 3A:
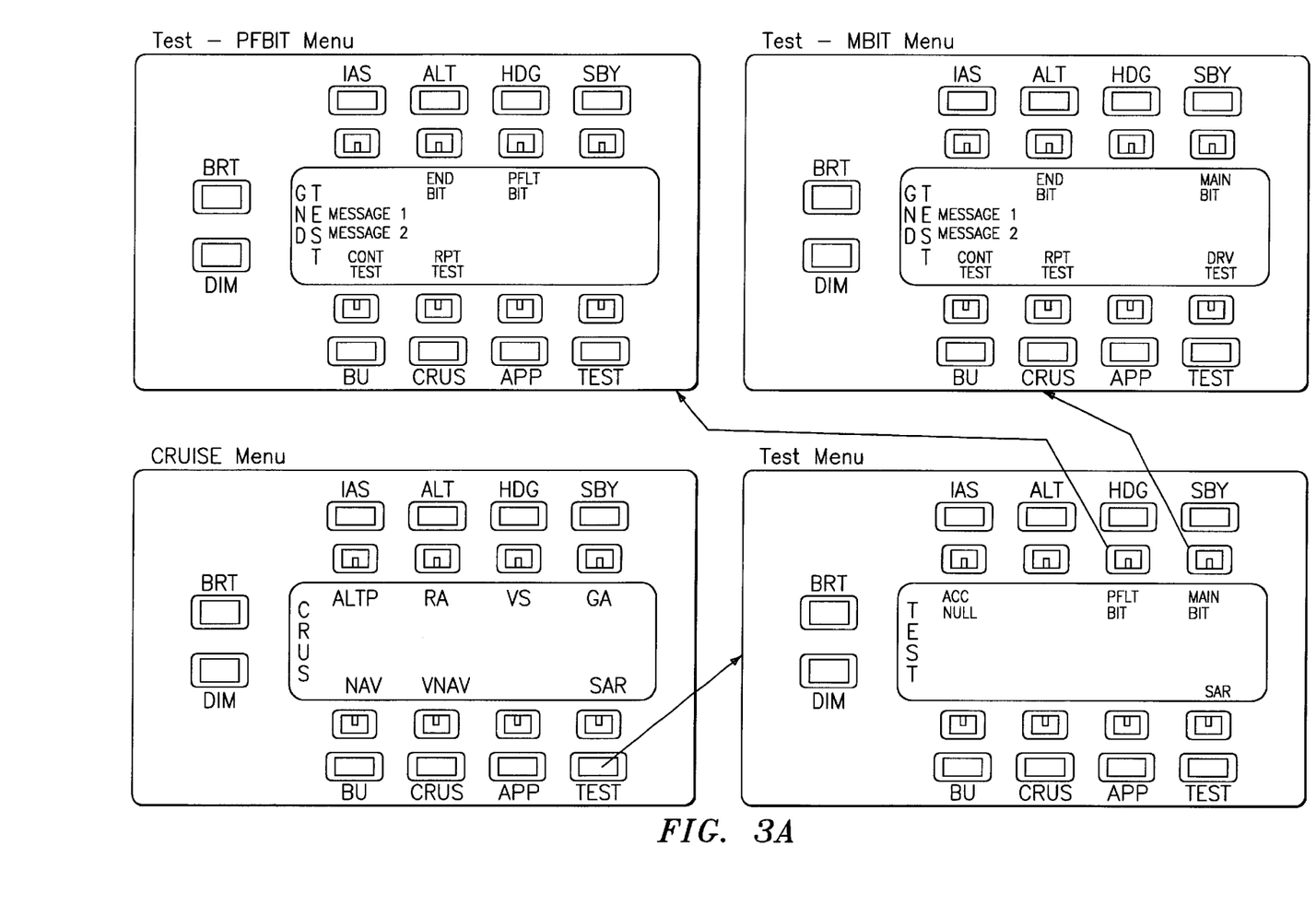
FIG. 3A is a schematic illustration similar to FIG. 3, but showing the display screen options that arise when the "TEST" switch and subsequent soft bezel switches are closed.

Part E of FIG. 3 shows the screen menu display when the VOR approach mode (VAP) is selected by pressing the soft bezel switch 80 in part B of FIG. 3. Once again, the fields 60 and 62 indicate that an approach mode and a VAP approach sub-mode have been selected by the pilot and enabled by the flight control computer. Actuation of the soft bezel switch 80 will execute the VAP approach mode, and actuation of the soft bezel switch 82 will execute a return to the screen of part B of FIG. 3. The foregoing explanation of sub-menu sequences which are enabled by closing certain ones of the hard wired switches, and which are executed by closing certain ones of the soft bezel switches is illustrative of only one of various sub-menu flight mode options that may be enabled by the assembly of this invention. It will be appreciated that the ability to switch from one sub-menu to another sub-menu requires the approval of the flight control computer 32 that the sub-menus are viable options in ongoing flight conditions FIG. 3A is similar to FIG. 3, but showing the screen sequence available when the "TEST" hard wired switch, and dependent bezel switches, are closed.

Figure 4:
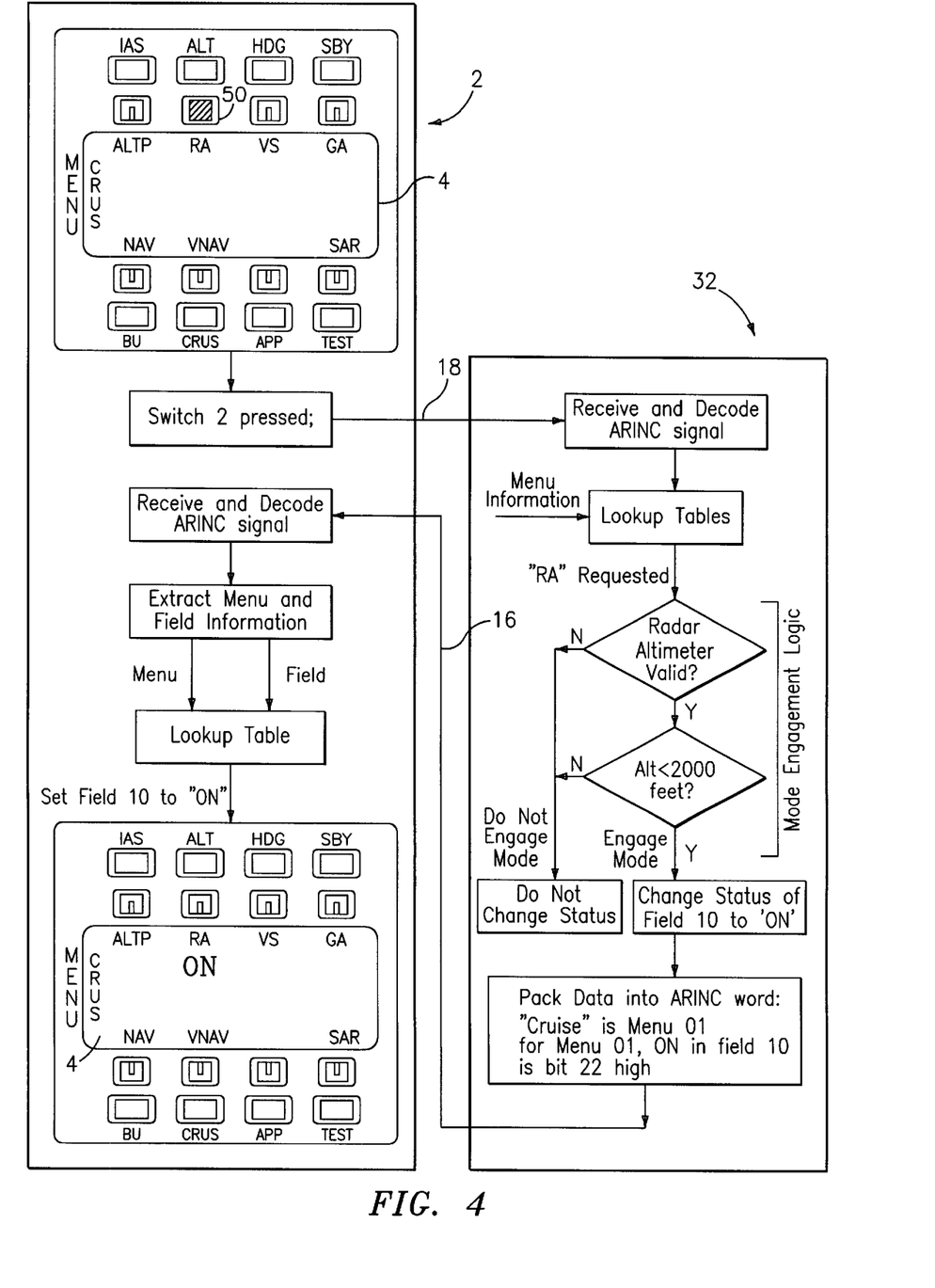
FIG. 4 is a typical flight selector mode engagement flow chart.

Referring now to FIG. 4, there is shown a typical software decision or logic tree which is used for executing a soft bezel switch flight mode command. The screen menu shows that the cruise flight mode has been enabled, and that the pilot has pressed the soft. bezel switch 50, which is the radar attitude hold (RA) command switch. The fact that the switch 50 has been closed is transmitted through the serial bus 18 to the flight control computer 32. The flight control computer 32 then consults a duplicate of the look up table which is stored in the computer 32. The computer 32 hen determines if the RA command is valid, and if so, it changes the bit sequence in the appropriate label for that command, and transmits the changed bit sequence back to the flight mode selector assembly 2 through the serial bus 16. The transmitted information is than decoded and the look up table in the assembly is alerted so as to indicate on the display screen 4 that the RA flight mode has been accepted and is "ON".

A significant unique feature of the flight mode selector is the look up table function. The uniqueness is in how data is presented in the table. The flight control computer transmits a single data word to the flight mode selector. This single data word contains all the information the flight mode selector needs to display the menu (fields 60 and 62), labels (fields 1 through 8 in FIG. 2) and status (fields 9 through 16 in FIG. 2). The advantage of a single data word over using multiple data words is a single data word takes less time to transmit, so response time is improved. Also, multiple data words require extra processing to ensure they arrive in the proper order, otherwise the display could be erroneous. A single data word is better, but it requires a way to encode all of the required data. All of the information is encoded in 19 bits of a 32-bit data word. The remaining 13 bits are used for label information and validity checking. The advantages of using a single data word are faster transmission and less processing.

The flight control computer determines what text is to be displayed, and uses its copy of the look up table to encode the data, which is sent over the serial bus to the flight mode selector. The flight mode selector uses its copy of the look up table to determine which text should be put onto the display. The table below displays a data packing table which shows that there are nineteen bits in the system, and that the first five bits are used to select the page of the look up table which will be used in selecting a particular flight mode. As presently configured, the look up table contains thirty one pages of screen field activation possibilities. Bit numbers 6 through 19 shown in the packing table correspond to hi and lo bits for fields 9 through 16, and the sample value column in the table indicates that a binary bit system of 0 and 1 is used. It will be noted that for certain of the fields, both the hi and lo sample values are 0, thereby indicating that no messages or indicia will appear in those fields during selection of a particular flight mode. Fields which will display indicia during flight mode selection will have a hi value of 1 and a lo value of 0, as indicated in the sample value column in the table below.

TABLE I

Data Packing

| Bit Number | Use | Sample Value |
|---|---|---|
| 1--------- | | 0 |
| 2 | | 0 |
| 3 | Page Select 0 through 31 | 1 |
| 4 | | 0 |
| 5--------- | | 0 |
| 6 | Field 9 Hi bit | 0 |
| 7 | Field 9 Lo bit | 0 |
| 8 | Field 10 bit | 0 |
| 9 | Field 11 bit | 0 |
| 10 | Field 12 Hi bit | 0 |
| 11 | Field 12 Lo bit | 0 |
| 12 | Field 13 Hi bit | 0 |
| 13 | Field 13 Lo bit | 1 |
| 14 | Field 14 Hi bit | 1 |
| 15 | Field 14 Lo bit | 0 |
| 16 | Field 15 Hi bit | 0 |
| 17 | Field 15 Lo bit | 0 |
| 18 | Field 16 Hi bit | 0 |
| 19 | Field 16 Lo bit | 0 |

Figure 5:
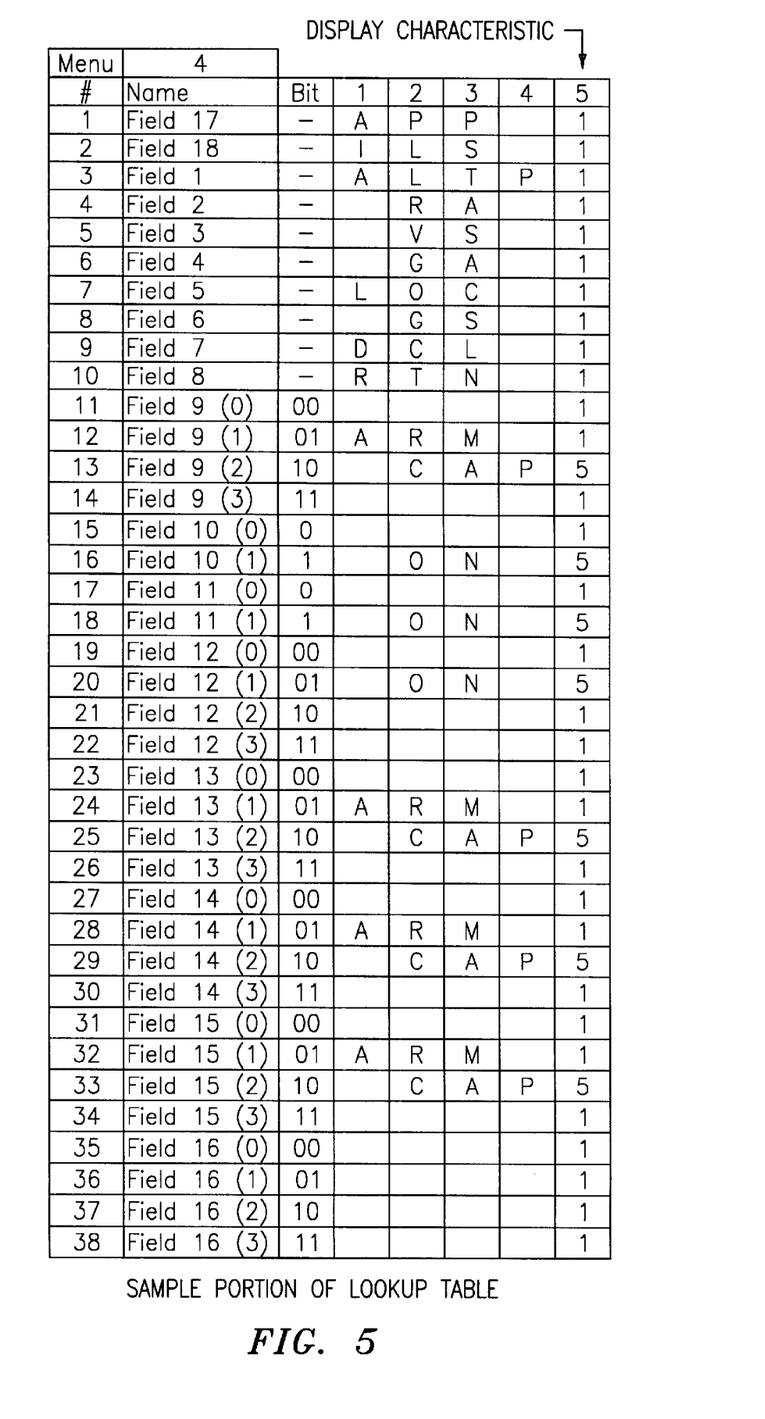
FIG. 5 is a schematic example of a typical page on the system look up table showing possiible flight mode selections for each of the fields on the display screen.

Bits 1 through 5 represent a five bit binary number, and the value displayed, 00100, corresponds to a value of 4. FIG. 5 shows the page of the look up table which governs the messages associated with menu number 4. Menu 4 controls screen menu text associated with fields 60 and 62 (see FIG. 2) when the aircraft is in an APP and ILS mode. Menu 4 also controls text associated with fields 56, 64, 65, 67, 86, 90, 94, and 98. The first column in FIG. 5 is a line number, which indicates that there are thirty eight entries in the look up table. The second, or "Name" column in FIG. 5 is a column which indicates the different fields which are controlled by page 4 of the look up table. It will noted that certain of the fields have only a single text option; others of the fields have two text options. The maximum number of text options is four (00, 01, 10, and 11). The third column in FIG. 5 shows the 0, 1 bit combinations that control the various screen texts that can be called up on the various screen fields. The columns in FIG. 5 are labeled "1","2","3" and "4" show the texts that will be displayed on the screen, and relates those texts to the various bit combinations which are displayed in the "Bit" column. The column labeled "5" in FIG. 5 shows the various text display characteristics, which are the colors of the displayed text on the screen. The numeral 5 indicates a green text display, and the numeral 1 indicates a white text display. Other codes can be placed in this column to indicate inverse text, flashing text, outlined text, and the like.

Figure 6:
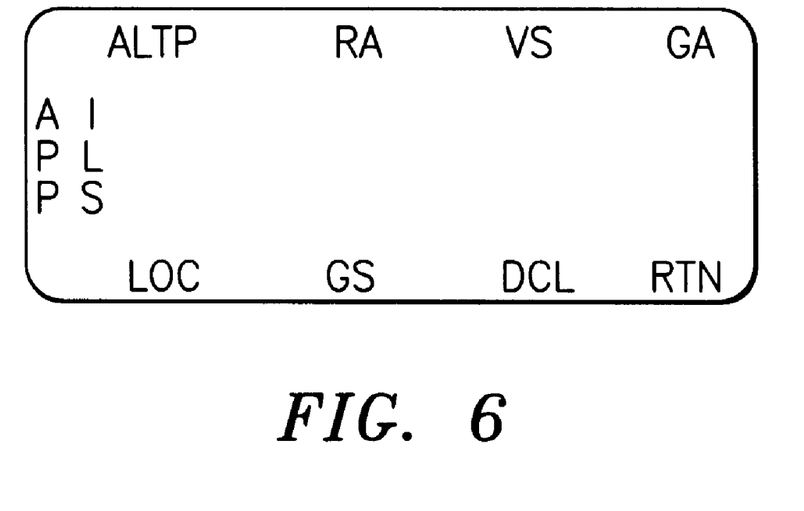
FIG. 6 illustrates the screen text that will appear in certain fields on the display screen when the processor is directed to a certain page of the look up table in the system by the pilot.

FIG. 6 illustrates the screen text that will appear in fields 60, 62, 56, 64, 65, 67, 86, 90, 94 and 98 when the processor 12 has selected page 4 of the look up table. The field 60 displays the general flight mode that the pilot has selected for the aircraft, which, as noted above, in the case of page 4 of the look up table, is an aircraft landing approach flight mode. The field 62 displays a specific type of landing approach, which an instrument landing. Page 4 of the look up table is accessed by the pilot actuating the fixed menu approach switch 72 followed by the ILS soft switch. As seen in FIG. 6, the texts appearing in fields 56, 64, 65, 67, 86, 90, 94 and 98 are, respectively, "ALTP" (altitude preselect); "RA" (radar altitude hold); "VS" (vertical speed hold); "GA" (go around); "LOC" (localizer); "GS" (glide slope); "DCL" (decelerate); and "RTN" (return from a sub-menu to a higher level menu). Once the screen menu shown in FIG. 6 appears, the pilot may then turn on or enable the available modes by pressing soft switches 48, 50, 52, 54, 76, 78 or 80, shown in FIG. 2. Soft switch 82 returns the display to the higher menu display level.

Figure 7:
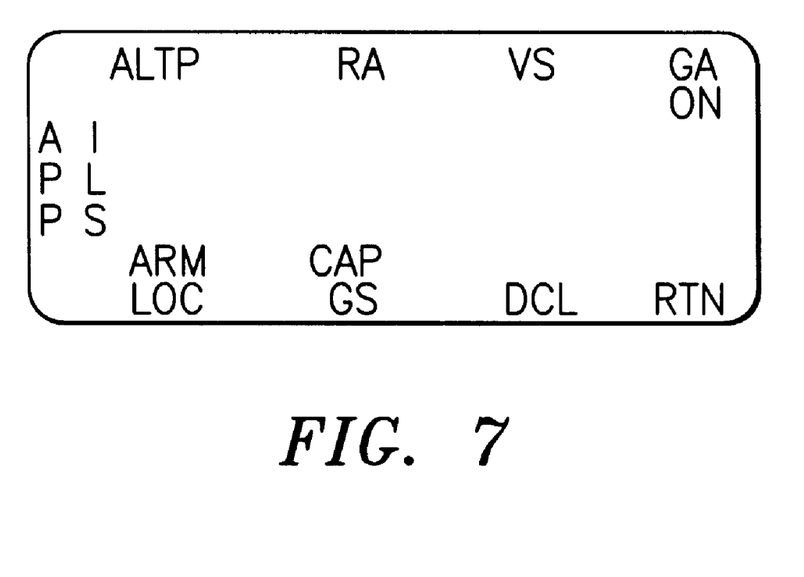
FIG. 7 illustrates the screen text that will appear in the field displayed in FIG. 6 once the go around flight mode selection has been selected by the pilot.

To achieve the result shown in FIG. 7, the pilot presses switches 54, 76 and 78. This having been done, the screen display will be as shown in FIG. 7, wherein field 71 displays the text "ON" which indicates that the GA flight mode selection has been activated; and wherein field 84 displays the text "ARM", which indicates that the LOC flight mode selection has been armed and is therefore waiting for one or more prerequisites to be satisfied; and wherein the field 88 displays the text "CAP", which indicates that the GS flight mode selection has been captured and engaged.

It will be readily appreciated that the system of this invention provides an aircraft flight mode selection system which is compact, light weight, and easy to use, and which can be used to select a number of different flight modes. The system can be altered simply by changing the software which keys the display panel, and alteration of the system does not require any additional hard wired switches. The aforesaid software updating changes can be performed through the use of a lap-top computer connected to the system control computer and processor. Thus the physical envelope which the system requires in the aircraft cockpit is relatively fixed.

Since many changes and variations of the disclosed embodiment of this invention may be made without departing from the inventive concept, it is not intended to limit the invention otherwise than as required by the appended claims.

What is claimed is:

1. An aircraft flight mode selector system comprising:
   a) a screen for displaying a plurality of general aircraft flight modes and for displaying subsidiary aircraft flight modes;
   b) a plurality of first switches which are operable, when closed, to cause different first general flight modes to be displayed on said screen, said first switches also being operable, when closed, to cause a plurality of different first subsidiary flight modes to be displayed on said screen, which first subsidiary flight modes are catagories of said displayed first general flight mode;
   c) a plurality of second switches which are operable, when closed, to select certain of said subsidiary flight modes for activation, said second switches also being operable, when closed, to cause said screen to display which of said subsidiary flight modes has been selected; and
   d) a flight control computer operably connected to said first and second switches, said flight control computer being operable to institute changes in the flight mode of the aircraft as dictated by closure of selected ones of said first and second switches.

2. The aircraft flight mode selector system of claim 1 wherein said first and second switches are connected to said flight control computer by means of serial buses.

3. An aircraft flight mode selector system comprising:
   a) a screen for displaying a plurality of general aircraft flight modes and for displaying subsidiary aircraft flight modes;
   b) a plurality of first switches which are operable, when closed, to cause different first general flight modes to be displayed on said screen, said first switches also being operable, when closed, to cause a plurality of different first subsidiary flight modes to be displayed on said screen, which first subsidiary flight modes are catagories of said displayed first general flight mode;

c) a plurality of second switches which are operable, when closed, to select certain of said subsidiary flight modes for activation, said second switches also being operable, when closed, to cause said screen to display which of said subsidiary flight modes has been selected; and d) a flight control computer operably connected to said first and second switches, said flight control computer being operable to institute changes in the flight mode of the aircraft as dictated by closure of selected ones of said first and second switches, and wherein certain of said second switches can be used to select different subsidiary flight modes, depending on which of said first switches has been closed.

4. The aircraft flight mode selector system of claim 3 wherein said first and second switches are connected to said flight control computer by means of serial buses.

5. The aircraft flight mode selector system of claim 4 further comprising an input/output controller interconnecting said first and second switches with said serial buses.

6. The aircraft flight mode selector system of claim 3 wherein said display screen includes a plurality of general flight mode fields in which selected general flight modes are displayed, and a plurality of specific flight mode fields in which available catagories of the general flight modes are displayed.

7. The aircraft flight selector of claim 6 wherein said general flight mode field displays are controlled by said first switches, and wherein said specific flight mode displays are controlled by said second switches.

8. The aircraft flight mode selector system of claim 3 wherein said second switches are soft wired bezel switches.

9. The aircraft mode selector system of claim 3 wherein said display screen further includes at least one pilot message display field whereby the flight control computer can alert an aircraft pilot of predetermined flight conditions.

* * * * *